United States Patent Office 2,890,187
Patented June 9, 1959

2,890,187
CURED POLYPROPYLENE

Lewis W. Bowman, Westfield, Robert F. Leary, Cranford, and William J. G. McCulloch, Plainfield, N.J., assignors to Esso Research and Engineering Company, a corporation of Delaware No Drawing. Application July 11, 1956
Serial No. 597,080

5 Claims. (Cl. 260—23.5)

This invention relates to vulcanized olefin polymers and methods of preparing same.

It has been known that polymers of mono-olefins can be prepared by polymerization with various catalysts such as Friedel-Crafts, sulfuric acid, phosphoric acid and the like. However, the resulting polymers have contained substantially no unsaturation, so that it has not been possible to vulcanize the products. A well known commercially available polyolefin is polyisobutylene prepared at low temperatures by polymerizing isobutylene with $AlCl_3$. In order to incorporate sufficient unsaturation into this polymer to be able to vulcanize it, it was found necessary to add a small amount of a diolefin such as isoprene to the feed. The resulting polymer has found ready acceptance on the market under the name of Butyl rubber. It can be vulcanized to yield cured products suitable as inner tubes and the like.

Recently it has been found that new types of polymers of mono-olefins of at least two carbon atoms can be prepared by contacting the olefin with a catalyst mixture formed by reacting an alkyl aluminum compound, such as aluminum triethyl or aluminum diethyl chloride with titanium tetrachloride or similar reducible halide.

It has now been found that olefin polymers obtained by polymerization in the presence of the above special catalysts can be cured in accordance with known curing methods to give new compositions of matter, suitable for uses wherever cured polymers are applicable, namely, in tires, tubes, curing bags and the like.

The primary material of the present invention is a polymer of a mono-olefin of three to four carbon atoms, e.g. propylene and butene-1. This polymer is prepared by contacting the olefin at atmospheric or elevated pressure and at temperatures of 15° to 125° C. in the presence of a catalyst obtained by mixing any aluminum alkyl compound having the general formula $R_3Al$ or $R_2AlX$, in which R is an alkyl radical having up to 20 carbon atoms or so, but preferably about 2 to 12 carbon atoms, such as ethyl, isobutyl, dodecyl, etc., or else R may be an aryl group such as phenyl, tolyl, xylyl, etc., or a cyclic aliphatic radical such as cyclohexyl. X is preferably a halogen, preferably Cl, Br, or F, but may also be an alkoxy group, e.g. $OCH_3$, $OC_2H_5$, etc. or aroxy, e.g. $OC_6H_5$, but also may be a radical of a secondary amine, acid amide, mercaptan, thiophenol, carboxylic acid, etc. Other metal alkyl compounds may be used such as dialkyl derivaties of magnesium or zinc, e.g. dimethyl magnesium, diethyl zinc, etc. Other usable reducing agents include metal aryl compounds, e.g. phenyl compounds of Al, Zn, Mg or Na, either alone or together with some Al trialkyl, or a dialkyl aluminum halide. Further, mixed reducing agents may be used such as a mixture of an alkali metal, an organo metal compound of Al, Mg or Zn, as, for instance, a mixture of sodium and tridodecyl aluminum.

The proportions in which the two catalyst components should be mixed initially for starting the polymerization reaction, may range from about 0.1 to 15, preferably about 0.2 to 12 moles of the reducing agent, e.g. aluminum triethyl per mole of $TiCl_4$ or other reducible metal compounds. Generally the higher ratios, e.g. 1 to 12 moles of metal alkyl per 1 mol of $TiCl_4$ give polymers of the higher molecular weights, e.g. polyethylene of 100,000 to 3,000,000 or more Staudinger molecular weight. On the other hand, catalyst ratios of 0.2 to 1 mole of metal alkyl per 1 mol of $TiCl_4$ generally give polymers, e.g. polyethylene, of substantially lower molecular weights in the range of 5,000 to 100,000. The molecular weight obtained also varies somewhat according to other polymerization conditions, e.g. the overall catalyst concentrations in respect to the diluent present, as well as the type of diluent, catalyst preparation temperature and time, and also the polymerization temperature.

The diluent to be used may be a substantially inert volatile or volatilizable organic liquid, but preferably is an inert hydrocarbon such as hexane, heptane, dodecane, benzene, toluene, etc. or mixed liquid fractions such as refined petroleum, heavy naphtha, kerosene, or gas oil fraction. Other diluents may be used such as halogenated aromatic compounds, e.g. orthodichlorobenzene, chlorinated naphthalene, naphthalene, etc. A convenient method of adding the catalyst components is to dissolve each in a portion of the diluent and then mix the resulting solution to make the initial combination catalyst. Additional diluent may be added either directly at the start of the polymerization or later during the course of the polymerization to prevent an undue thickening of the reaction mixture due to formation of solid polymer particles.

The concentration of catalyst components to be used may vary somewhat according to the other polymerization reaction factors, but normally range from about 0.1 to 10 grams of total combination catalyst per 100 ml. of diluent, at the start of the polymerization reaction, to be followed, if desired, by additional diluent which may amount to an additional 100 or 200 volumes per 100 volumes at the start of polymerization.

The catalyst preparation temperature should be about 0° C. to 100° C., preferably about 30° C. to 50° C. and generally it is preferred to maintain the resulting catalyst mixture or complex in a state of an agitated slurry for a time of about 10 minutes to an hour, preferably about 15 to 45 minutes to permit the combination catalyst to develop a desired state of catalytic activity.

The above mentioned preparation of the catalyst may either take place directly in the polymerization reactor or in a separate catalyst preparation zone from which it may be transferred when ready into the polymerization reactor. If additional catalyst is to be added this should be done after the catalyst has been prepared and the entire catalyst dispersion should then be brought to the desired polymerization starting temperature which may range from about 20° C. (or room temperature) up to about 100° C., but is preferably about 30° to 50° C., there being generally a further increase in temperature during the course of polymerization. The main operating temperature may be desirably kept in the range of 30° to 80° C. but generally should be about 40° to 70° C.

I should be noted that all equipment used for storage, preparation, transfer, or utilization of the catalyst components and mixed catalyst slurry should be blanketed with suitable inert gas such as nitrogen, because some of the catalyst components are inflammable and combustible.

When the catalyst-diluent dispersion had been brought to the desired polymerization temperature the olefin to be polymerized, which has preferably been purified for removal of harmful trace impurities, e.g. oxygen, $H_2O$, etc. e.g. by dehydration through activated alumina and contacting with a solution of aluminum triethyl, such as by scrubbing the gas with an n-heptane solution of aluminum triethyl, is contacted with the catalyst dispersion, e.g. by bubbling the propylene gas up through the catalyst-diluent slurry preferably maintained in a state of good agitation.

Polymerization occurs, and the temperature is permitted to rise to the desired operating temperature, with application of cooling, e.g. by refrigerating jacket, to prevent overheating.

Although the polymerization reaction can be carried out adequately at atmospheric pressure, it is possible to use slightly superatmospheric pressures up to 5 or 10 atmospheres or so.

After the polymerization has been carried out either to the desired catalyst efficiency, as indicated by the production of preferably 50 to 100 grams or more of polymer per gram of catalyst, in the case of batch operation, or until reactor equipment becomes fouled by deposition of polymer on the surfaces of the equipment coming in contact with the reaction liquid, the reaction may be stopped by adding a catalyst deactivator, e.g. by the addition of 0.1 to 1 volume of an alcohol, e.g. isopropyl, or isobutyl alcohol per volume of polymerization reaction slurry. The polymer is then recovered from the resultant slurry by suitable means such as filtration centrifuging, etc., and then is preferably washed by stirring with additional amounts of butyl alcohol or other solvent to remove residual traces of catalyst entrained in the polymer. The washed polymer, generally in the form of a granular or powdered material, may then be dried, e.g. by heating and/or vacuum.

Instead of $TiCl_4$, one may use other reducible compounds of a metal of groups IV B, V B, and VI B of the periodic table, including, for example, halides, oxides, hydroxides, alcoholates, acetal acetonates, etc. of the metals including Ti, Zr, Hf, V, Nb, Ta, Cr, Mo, and W, or group VIII metals, e.g. Fe, Ni, Pd, and Mn, these group VIII metal compounds, e.g. $FeCl_3$ or $MnCl_2$, being especially useful with reducing agents of the dialkyl aluminum halide type.

The polymer products have intrinsic viscosities generally within the range of about 0.2 to 6.0, usually in the range of about 0.3 to 2.5. These intrinsic viscosities correspond generally to molecular weights in the range of about 5,000 to 500,000, usually about 10,000 to 100,000. The molecular weights referred to herein are obtained from the correlation of Harris in the Journal of Polymer Science, vol. 8, 361 (1952). These polymers may be cured by known methods to give for the first time cured mono-olefinic polymers. Infrared analysis of these polymers shows considerable unsaturation as does iodine-mercuric acetate analysis. The vulcanizates show decreased swelling characteristics over the unvulcanized polymer and is insoluble in heptane. Two types of cure are particularly effective, i.e. sulfur cure and benzothiazyl-paraquinone dioxime cure. Each of these types of cure is described below.

SULFUR CURE

The necessary ingredients for this type of cure are sulfur and an accelerator which contains sulfur in its structure. This latter material accelerates the vulcanization process of addition to the double bond and therefore makes for a shorter cure time with a more efficient cure. 1 to 3 parts by weight of sulfur per 100 parts by weight of polypropylene appear necessary for a satisfactory vulcanizate. Using 4 parts or more of sulfur results in a poorer vulcanizate due to the degrading effect of the free sulfur which has not been utilized. Accelerator concentrations vary considerably; with tellurium diethyl dithiocarbamate, however, best results are given by a 0.5-5 part concentration. At least 1 part would be necessary for an acceptable cure with no other accelerators present. Six parts of this material give poor results. It is also desirable to include 1 to 20 parts of zinc oxide and 0.5 to 5 parts of stearic acid in the recipe.

BENZOTHIAZYL DISULFIDE CURE

Benzothiazyl disulfide acts as a mild oxidizing agent for paraquinone dioxime by virtue of the clevage of the disulfide to form two mercaptan molecules. Apparently the conversion of the dioxime to the nitroso group brought about by the loss of a hydrogen atom results in the same type of vulcanization mechanism as for the paraquinone dioxime cure. The following limits in parts by weight per 100 parts by weight of polypropylene apply for this particular cure: Benzothiazyl disulfide 1.0 to 6.0, preferably 4; paraquinone dioxime 1.0 to 8.0, preferably 2, zinc oxide 1 to 20 parts, and stearic acid 0.5 to 5 parts.

The following examples illustrate the advantages of the invention:

Example I 1.6 grams $TiCl_4$ in 10 cc. n-heptane solution was added to 2 gm. $Al(C_2H_5)_3$ in 20 cc. n-heptane solution at 25° C. After standing for 15 minutes, the slurry was added to a 2-liter glass resin flask, diluted to 500 cc. total volume with n-heptane and gaseous propylene bubbled through the slurry at a rate of 800 cc./min. for a period of 8 hours. The temperature rose from 25° C. at the beginning of the run to a maximum of 41° C. after one hour. Heat was then supplied to the reactor and the temperature maintained at 50–56° C. for the remainder of the run. The entire process was carried out in glass equipment and maintained under a nitrogen blanket.

After 8 hours the reaction mixture was quenched with 100 cc. n-butyl alcohol. The slurry was then poured into 2-liter of isopropyl alcohol, the precipitated polymer filtered, washed with acetone and dried for 18 hours in a vacuum oven at 55–60° C. A yield of 152 grams was obtained.

Example II

The polymer of Example I was vulcanized with sulfur in accordance with the following recipe:

| | Parts by wt. |
|---|---|
| Polypropylene | 20 |
| ZnO | 1 |
| Sulfur | .4 |
| Stearic acid | .2 |
| Tellurium diethyl dithiodicarbamate | .2 |

Rebound blocks of the above polymer mixture were prepared and cured at 307° C. for 45 minutes under a pressure of 1500 lbs. sq. in. gauge. The cured samples were immersed in carbon tetrachloride for 65 hours at 25° C. At the end of this time, the wet samples were removed and weighed. They were then placed in a vacuum desiccator for 15 hours and again weighed. From the density of the wet and dry samples the volume ratio of the two samples were determined and compared with uncured samples with the following results:

| | Vol. ratio of wet/dry |
|---|---|
| Cured polymer | 5.9 |
| Uncured polymer | 10.9 |

Example III

The polymer of Example I was also cured with the following recipe:

| | Parts by weight |
|---|---|
| Polypropylene | 20 |
| ZnO | 1 |
| Stearic acid | .2 |
| Paraquinone dioxime | .4 |
| Benzothiazyl disulfide | .8 |

Rebound blocks of the resulting cured polymer were prepared and treated as in Example II. The volume ratio of the wet and dry samples were determined with the following results:

| | Vol. ratio of wet/dry |
|---|---|
| Cured polymer | 6.7 |
| Uncured polymer | 10.5 |

The results obtained by the above examples show that the polypropylene prepared as above described has been successfully cured.

The nature of the present invention having been thus fully set forth and specific examples of the same given, what is claimed as new and useful and desired to be secured by Letters Patent is:

1. Polypropylene having an intrinsic viscosity in the range of 0.2 to 6.0 prepared by polymerizing propylene with an alkyl aluminum-titanium halide catalyst and cured by a curing mixture selected from the group consisting of curing mixture A consisting of sulfur, an accelerator which contains sulfur in its structure, zinc oxide and stearic acid and curing mixture B consisting of paraquinone dioxime, benzothiazyl disulfide, zinc oxide and stearic acid, said curing mixtures having the following parts by weight based on 100 parts by weight of polypropylene; curing mixture A, 1 to 3 parts of sulfur, 0.5 to 5 parts of an accelerator which contains sulfur in its structure, 1 to 20 parts zinc oxide, 0.5 to 5 parts stearic acid; curing mixture B, 1 to 6 parts of benzothiazyl disulfide, 1 to 8 parts of paraquinone dioxime, 1 to 20 parts of zinc oxide and 0.5 to 5 parts of stearic acid.

2. A composition of matter consisting essentially of (a) 100 parts of polypropylene having a viscosity in the range of 0.2 to 6.0 and prepared by polymerizing propylene with an alkyl aluminum-titanium halide catalyst, (b) 1 to 20 parts of zinc oxide, (c) 0.5 to 5 parts of stearic acid, (d) 1 to 3 parts sulfur, and (e) 0.5 to 5 parts of tellurium diethyl dithiocarbamate, said composition having been cured for between 15 to 120 minutes at a temperature between 250° and 400° F.

3. A composition of matter consisting essentially of (a) 100 parts of polypropylene having a viscosity in the range of 0.2 to 6.0 and prepared by polymerizing propylene with an alkyl aluminum-titanium halide catalyst, (b) 1 to 20 parts of zinc oxide, (c) 0.5 to 5 parts of stearic acid, (d) 0.5 to 5 parts of paraquinone dioxime, and (e) 0.5 to 5 parts of benzothiazyl disulfide, said composition having been cured for between 15 to 120 minutes at a temperature of 250° to 400° F.

4. A composition of matter consisting essentially of (a) 100 parts of polypropylene having a viscosity in the range of 0.2 to 6.0 and prepared by polymerizing propylene with an alkyl aluminum-titanium halide catalyst, (b) 5 parts of zinc oxide, (c) 1 part of stearic acid, (d) 2 parts of sulfur, and (e) 1 part of tellurium diethyl dithiocarbamate, said composition having been cured for 45 minutes at 307° F.

5. A composition of matter consisting essentially of (a) 100 parts of polypropylene having a viscosity in the range of 0.2 to 6.0 and prepared by polymerizing propylene with an alkyl aluminum-titanium halide catalyst, (b) 5 parts of zinc oxide, (c) 1 part of stearic acid, (d) 2 parts of paraquinone dioxime, and (e) 4 parts of benzothiazyl disulfide, said composition having been cured for 45 minutes at 307° F.

References Cited in the file of this patent

UNITED STATES PATENTS

| 2,582,510 | Stiratelli | Jan. 15, 1952 |
| 2,710,291 | Little | June 7, 1955 |
| 2,748,104 | Viohl | May 29, 1956 |

FOREIGN PATENTS

| 538,782 | Belgium | Dec. 6, 1955 |